United States Patent
Shen et al.

(10) Patent No.: US 9,098,153 B2
(45) Date of Patent: Aug. 4, 2015

(54) TOUCH PANEL EXCITATION USING A DRIVE SIGNAL HAVING TIME-VARYING CHARACTERISTICS

(75) Inventors: Guozhong Shen, San Jose, CA (US); Ozan E. Erdogan, Saratoga, CA (US)

(73) Assignee: Qualcomm Technologies, Inc., San Diego, CA (US)

( * ) Notice: Subject to any disclaimer, the term of this patent is extended or adjusted under 35 U.S.C. 154(b) by 434 days.

(21) Appl. No.: 13/571,765

(22) Filed: Aug. 10, 2012

(65) Prior Publication Data

US 2013/0194225 A1  Aug. 1, 2013

Related U.S. Application Data (60) Provisional application No. 61/593,836, filed on Feb. 1, 2012, provisional application No. 61/594,326, filed on Feb. 2, 2012.

(51) Int. Cl.
*G06F 3/045* (2006.01)
*G06F 3/041* (2006.01)
*G06F 3/044* (2006.01)

(52) U.S. Cl.
CPC .............. *G06F 3/044* (2013.01); *G06F 3/0416* (2013.01); *G06F 3/041* (2013.01); *G06F 3/045* (2013.01)

(58) Field of Classification Search
CPC .................. G06F 3/045; G06F 3/042
USPC ................................... 345/173–174
See application file for complete search history.

(56) References Cited

U.S. PATENT DOCUMENTS

| | | | | |
|---|---|---|---|---|
| 6,473,075 | B1 * | 10/2002 | Gomes et al. | 345/177 |
| 8,592,697 | B2 | 11/2013 | Hotelling et al. | |
| 2010/0085332 | A1 | 4/2010 | Takahashi et al. | |
| 2010/0097346 | A1 * | 4/2010 | Sleeman | 345/174 |
| 2011/0102360 | A1 * | 5/2011 | Chen et al. | 345/173 |
| 2011/0134076 | A1 | 6/2011 | Kida et al. | |
| 2011/0157069 | A1 | 6/2011 | Zhuang et al. | |
| 2011/0175847 | A1 * | 7/2011 | Wang et al. | 345/174 |
| 2011/0310054 | A1 | 12/2011 | Souchkov | |
| 2013/0113722 | A1 * | 5/2013 | Lee et al. | 345/173 |

* cited by examiner

*Primary Examiner* — Lun-Yi Lao
*Assistant Examiner* — Jarurat Suteerawongsa
(74) *Attorney, Agent, or Firm* — Advent, LLP (57) ABSTRACT

A capacitive touch panel may include a driver and a drive electrode configured to be connected to the driver. The driver is configured to power the drive electrode with a drive signal having a first signal characteristic during a first time interval, and a second signal characteristic different from the first signal characteristic during a second time interval subsequent to the first time interval. The first signal characteristic may comprise one or more of a first frequency, a first phase, or a first amplitude during the first time interval, and the second signal characteristic may comprise one or more of a second frequency, a second phase, or a second amplitude, where one or more of the first frequency, first phase, or first amplitude may be different from one or more of the second frequency, second phase, or second amplitude, respectively.

17 Claims, 5 Drawing Sheets

TOUCH PANEL EXCITATION USING A DRIVE SIGNAL HAVING TIME-VARYING CHARACTERISTICS

CROSS-REFERENCE TO RELATED APPLICATIONS

The present application claims the benefit under 35 U.S.C. §119(e) of U.S. Provisional Application Ser. No. 61/593,836, filed Feb. 1, 2012, and titled "MULTI-FREQUENCY TOUCH PANEL EXCITATION" and U.S. Provisional Application Ser. No. 61/594,326, filed Feb. 2, 2012, and titled "TOUCH PANEL EXCITATION USING A DRIVER SIGNAL HAVING TIME-VARYING CHARACTERISTICS." U.S. Provisional Application Ser. Nos. 61/593,836 and 61/594,326 are herein incorporated by reference in their entireties.

BACKGROUND

A touch panel is a human machine interface (HMI) that allows an operator of an electronic device to provide input to the device using an instrument such as a finger, a stylus, and so forth. For example, the operator may use his or her finger to manipulate images on an electronic display, such as a display attached to a mobile computing device, a personal computer (PC), or a terminal connected to a network. In some cases, the operator may use two or more fingers simultaneously to provide unique commands, such as a zoom command, executed by moving two fingers away from one another; a shrink command, executed by moving two fingers toward one another; and so forth.

A touch screen is an electronic visual display that incorporates a touch panel overlying a display to detect the presence and/or location of a touch within the display area of the screen. Touch screens are common in devices such as all-in-one computers, tablet computers, satellite navigation devices, gaming devices, and smartphones. A touch screen enables an operator to interact directly with information that is displayed by the display underlying the touch panel, rather than indirectly with a pointer controlled by a mouse or touchpad. Capacitive touch panels are often used with touch screen devices. A capacitive touch panel generally includes an insulator, such as glass, coated with a transparent conductor, such as indium tin oxide (ITO). As the human body is also an electrical conductor, touching the surface of the panel results in a distortion of the panel's electrostatic field, measurable as a change in capacitance.

SUMMARY

A capacitive touch panel is disclosed that may include a driver and a drive electrode configured to be connected to the driver. The driver is configured to power the drive electrode with a drive signal having a first signal characteristic during a first time interval, and at least a second signal characteristic different from the first signal characteristic during a second time interval subsequent to the first time interval. The first signal characteristic may comprise one or more of a first frequency, a first phase, or a first amplitude during the first time interval, and the second signal characteristic may comprise one or more of a second frequency, a second phase, or a second amplitude, where one or more of the first frequency, first phase, or first amplitude may be different from one or more of the second frequency, second phase, or second amplitude, respectively. For example, the drive signal may comprise a first frequency during the first time interval and a second frequency different from the first frequency during the second time interval. The drive signal may also comprise a first phase during the first time interval and a second phase different from the first phase during the second time interval. The drive signal may further comprise a first amplitude during the first time interval and a second amplitude different from the first amplitude during the second time interval. Further, the drive signal can comprise additional signal characteristics (e.g., frequency, phase, and/or amplitude) different from the first and second signal characteristics during time intervals subsequent to the second time interval. Further, during the first, second, and any subsequent time interval, two or more drive signals may have one or more signal characteristics (e.g., frequency, phase, and/or amplitude) that are the same as one another or no signal characteristics that are the same as one another.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Cross-bar X and Y ITO patterns are typically used in mutual capacitance-based capacitive touch panels. It may be desirable to avoid noise in a touch panel system by modulating the drive signal and detecting it with demodulation to minimize/mitigate the effect of external noise on the system. Accordingly, a technique for altering one or more characteristics of a drive signal provided to a drive electrode for a touch panel system is provided. For example, using a frequency hopping implementation, one or more drive signals can be provided at a first frequency (f1) during a first time slot (interval), the one or more drive signals can be provided at a second frequency (f2) during a second time slot, and so on. A scan consists of multiple time slots. At each time slot and/or within a time slot, one, two, or more than two (e.g., three, four, five, etc.) of the frequency, phase, amplitude, and so forth of one or several drive signal waveforms can be changed. In example implementations, the excitation frequencies can be at least substantially different for each slot, or may alternate between two or more different frequencies. A digitally controlled oscillator can be used to generate the excitation waveforms. A lookup table can be used to cycle through a pre-selected and/or random (e.g., pseudorandom) list of drive signal characteristics (e.g., frequencies).

Example Implementations

Figure 1:
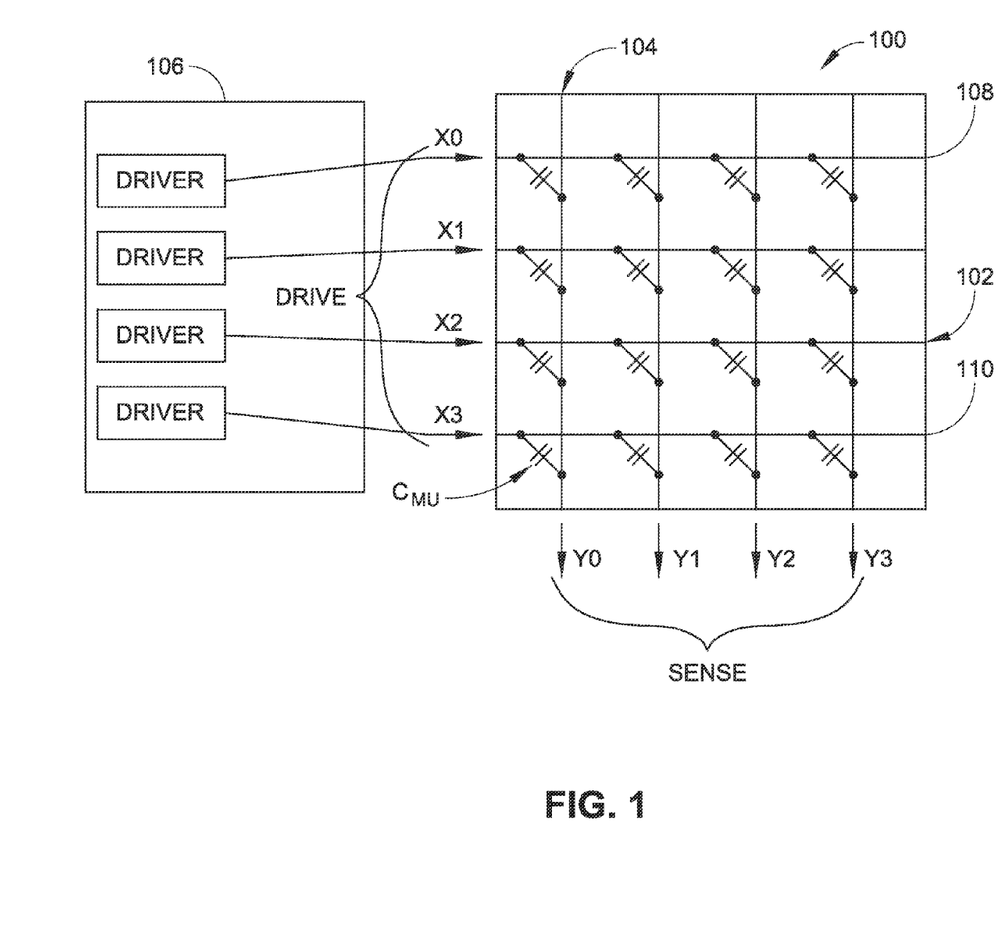
FIG. 1 is a diagrammatic illustration of a mutual capacitance Projected Capacitive Touch (PCT) panel in accordance with example implementations of the present disclosure.
Figure 2:
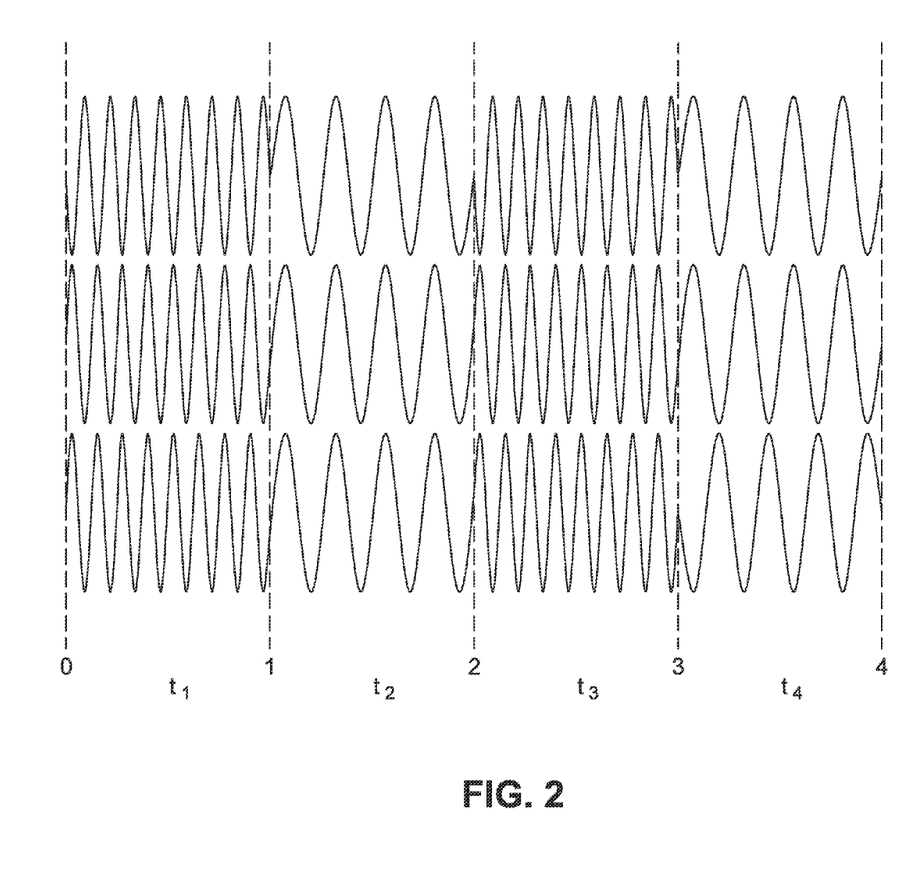
FIG. 2 is a graph illustrating example drive signal waveforms for the apparatus illustrated in FIG. 1, where the drive signal waveforms vary in frequency and phase during different time intervals in accordance with example implementations of the present disclosure.
Figure 3:
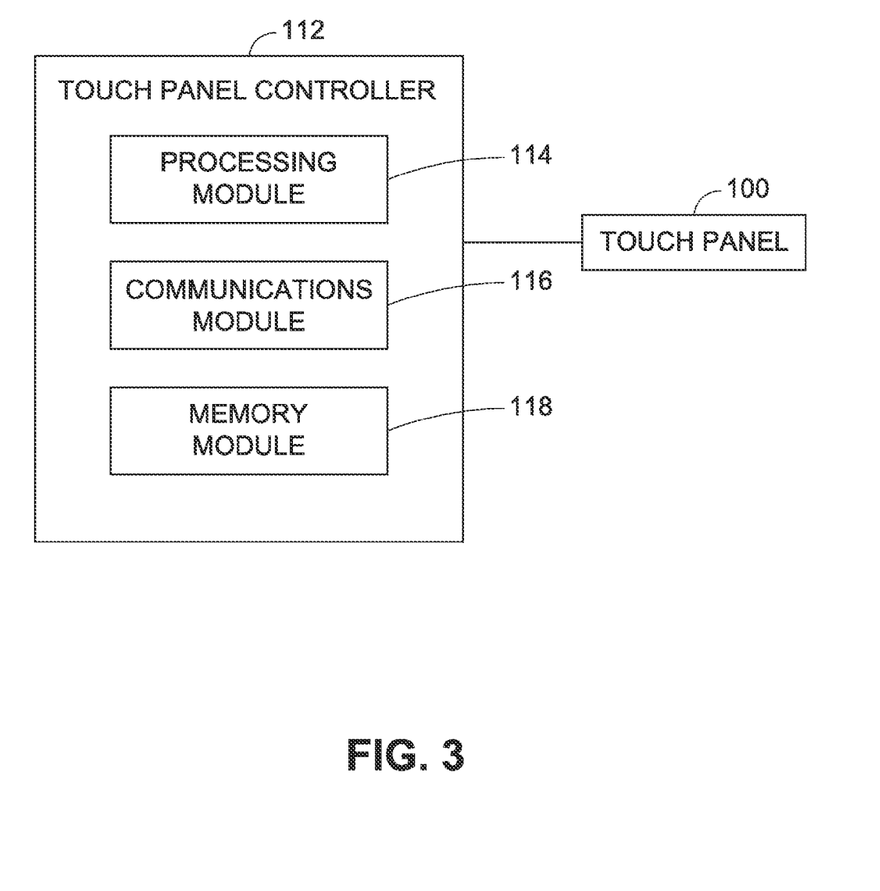
FIG. 3 is a diagrammatic illustration of a touch panel controller in accordance with example implementations of the present disclosure.

FIGS. 1 through 3 illustrate example mutual capacitance Projected Capacitive Touch (PCT) panels 100 in accordance with example implementations of the present disclosure.

Capacitive touch panels 100 can be used to interface with electronic devices including, but not necessarily limited to: large touch panel products, all-in-one computers, mobile computing devices (e.g., hand-held portable computers, Personal Digital Assistants (PDAs), laptop computers, netbook computers, tablet computers, and so forth), mobile telephone devices (e.g., cellular telephones and smartphones), portable game devices, portable media players, multimedia devices, satellite navigation devices (e.g., Global Positioning System (GPS) navigation devices), e-book reader devices (eReaders), Smart Television (TV) devices, surface computing devices (e.g., table top computers), Personal Computer (PC) devices, as well as with other devices that employ touch-based human interfaces.

Capacitive touch panels 100 may comprise ITO touch panels that include drive electrodes 102, such as X-axis and/or Y-axis cross-bar ITO drive traces/tracks, arranged next to one another (e.g., along parallel tracks, generally parallel tracks, and so forth). The drive electrodes 102 are elongated (e.g., extending along a longitudinal axis). For example, each drive electrode 102 may extend along an axis on a supporting surface, such as a substrate of a capacitive touch panel 100. The capacitive touch panels 100 also include sensor electrodes 104, such as cross-bar X-axis and/or Y-axis ITO sensor traces/tracks, arranged next to one another across the drive electrodes 102 (e.g., along parallel tracks, generally parallel tracks, and so forth). The sensor electrodes 104 are elongated (e.g., extending along a longitudinal axis). For instance, each sensor electrode 104 may extend along an axis on a supporting surface, such as a substrate of a capacitive touch panel 100.

The drive electrodes 102 and the sensor electrodes 104 define a coordinate system where each coordinate location (pixel) comprises a capacitor formed at each junction between one of the drive electrodes 102 and one of the sensor electrodes 104. Thus, the drive electrodes 102 are configured to be connected to one or more electrical circuits and/or electronic components (e.g., one or more drivers 106) to generate a local electric field at each capacitor. A change in the local electric field generated by an instrument (e.g., a finger or a stylus) at each capacitor formed at a drive electrode 102 and a sensor electrode 104 causes a change (e.g., a decrease) in capacitance associated with a touch at the corresponding coordinate location. In this manner, more than one touch may be sensed at differing coordinate locations simultaneously (or at least substantially simultaneously). In implementations, the drive electrodes 102 can be driven by the one or more of the drivers 106 in parallel, e.g., where a set of different signals are provided to the drive electrodes 102. In other implementations, the drive electrodes 102 can be driven by the drivers 106 in series, e.g., where each drive electrode 102 or subset of drive electrodes 102 is driven one at a time.

Figure 5:
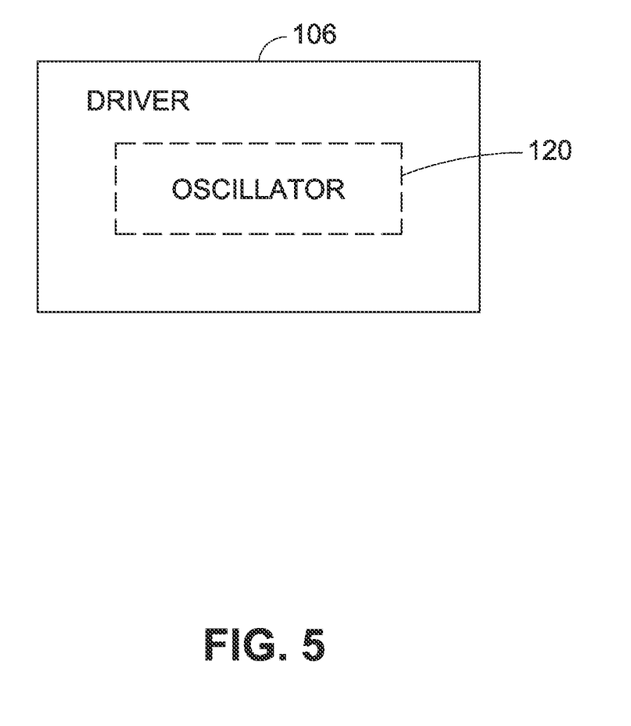
FIG. 5 is a block diagram illustrating a driver for a touch panel, such as the touch panel illustrated in FIG. 1, in accordance with example implementations of the present disclosure.

In implementations, the capacitive touch panel 100 may be configured to connect to one or more drivers 106, which may comprise, for example, one or more digitally controlled oscillators 120 (e.g., as shown in FIG. 5). In other implementations, the drivers 106 may be included with a capacitive touch panel assembly (e.g., as part of a capacitive touch panel controller configured for use with a touch screen assembly, and so forth). For example, as illustrated in FIG. 3, a capacitive touch panel 100 may be coupled with a touch panel controller 112 for controlling the capacitive touch panel 100. The touch panel controller 112 may include a processing module 114, a communications module 116, and a memory module 118. The processing module 114 provides processing functionality for the touch panel controller 112 and may include any number of processors, micro-controllers, or other processing systems and resident or external memory for storing data and other information accessed or generated by the touch panel controller 112. The processing module 114 may execute one or more software programs, which implement techniques described herein. The processing module 114 is not limited by the materials from which it is formed or the processing mechanisms employed therein, and as such, may be implemented via semiconductor(s) and/or transistors (e.g., using electronic Integrated Circuit (IC) components), and so forth. The communications module 116 is operatively configured to communicate with components of the touch panel. For example, the communications module 116 can be configured to control drive electrodes of the touch panel, receive inputs from sensor electrodes of the touch panel, and so forth. The communications module 116 is also communicatively coupled with the processing module 114 (e.g., for communicating inputs from the sensor electrodes of the touch panel 100 to the processing module 114).

The memory module 118 is an example of tangible computer-readable media that provides storage functionality to store various data associated with operation of the touch panel controller 112, such as software programs and/or code segments, or other data to instruct the processing module 114 and possibly other components of the touch panel controller 112 to perform the steps described herein. For example, memory module 118 may be used to store a lookup table for determining one or more signal characteristics of a drive signal. Thus, the lookup table can specify a first frequency (f1) for a drive signal for a first time interval, a second frequency (f2) for a second time interval, and so on. However, frequency is provided by way of example only and is not meant to be restrictive of the present disclosure. Thus, the lookup table may also store signal characteristics including, but not necessarily limited to: phase, amplitude, and so forth. In this manner, the lookup table can be used to cycle through a pre-selected and/or random (e.g., pseudorandom) list of drive signal characteristics.

Although a single memory module 118 is shown, a wide variety of types and combinations of memory may be employed. The memory module 118 may be integral with the processing module 114, may comprise stand-alone memory, or may be a combination of both. The memory module 118 may include, but is not necessarily limited to: removable and non-removable memory components, such as Random Access Memory (RAM), Read-Only Memory (ROM), Flash memory (e.g., a Secure Digital (SD) memory card, a mini-SD memory card, and/or a micro-SD memory card), magnetic memory, optical memory, Universal Serial Bus (USB) memory devices, and so forth. In embodiments, the touch panel controller 112 and/or memory 118 may include removable Integrated Circuit Card (ICC) memory, such as memory provided by a Subscriber Identity Module (SIM) card, a Universal Subscriber Identity Module (USIM) card, a Universal Integrated Circuit Card (UICC), and so on.

As illustrated in FIG. 2, the drivers 106 are configured to power the drive electrodes 102 with one or more drive signals having a first signal characteristic during a first time interval $t_1$, and a second signal characteristic at least substantially different from the first signal characteristic during a second time interval $t_2$ subsequent to the first time interval $t_1$. The drive electrodes 102 may then be powered with a signal having the first signal characteristic during a subsequent time interval $t_3$, and again with a signal having the second signal characteristic during a further time interval $t_4$. It should be noted that while FIG. 2 illustrates sinusoidal waveforms, this configuration is provided by way of example only and is not meant to be restrictive of the present disclosure. Thus, other waveforms, including other periodic waveforms, such as pulse waveforms and the like, may be used as well. In implementations, one or more of the drivers 106 may be configured to cycle through a pre-selected list of frequencies (e.g., using a lookup table or the like).

Representative signal characteristics include one or more of, but are not necessarily limited to: frequency, phase, and/or amplitude. It should also be noted that one or more signals having more than two (e.g., three, four, five, etc.) different characteristics may be utilized. For example, one or more of the drivers 106 can be configured to power the drive electrodes 102 with a drive signal having a first signal characteristic during a first time interval $t_1$, a second signal characteristic different from the first signal characteristic during a second time interval $t_2$, a third signal characteristic different from the first and second signal characteristics during a third time interval $t_3$, (possibly a fourth signal characteristic different from the first, second, and third signal characteristics during a fourth time interval $t_4$), and so forth.

Further, different signals may be provided to different drive electrodes. For example, one driver can be configured to power a drive electrode 108 (or a subset of two or more drive electrodes) with a drive signal having a first signal characteristic during a first time interval $t_1$, and another driver can be configured to power another drive electrode 110 (or a subset of two or more drive electrodes) with another drive signal having a second signal characteristic different from the first signal characteristic during at least a portion of the first time interval $t_1$. It should be noted that the drive signal used to power the second drive electrode 110 may be different from the drive signal used to power the first drive electrode 108 for all or at least substantially all of the first time interval $t_1$, or may be different for only a portion of the first time interval $t_1$. For instance, the drive signal used to power the second drive electrode 110 may be different from the drive signal used to power the first drive electrode 108 for approximately one-half (½) of the first time interval $t_1$.

In implementations, the sensor electrodes 104 are electrically insulated from the drive electrodes 102 (e.g., using a dielectric layer, and so forth). For example, the sensor electrodes 104 may be provided on one substrate (e.g., comprising a sense layer disposed on a glass substrate), and the drive electrodes 102 may be provided on a separate substrate (e.g., comprising a drive layer disposed on another substrate). In this two-layer configuration, the sense layer can be disposed above the drive layer (e.g., with respect to a touch surface). For example, the sense layer can be positioned closer to a touch surface than the drive layer. However, this configuration is provided by way of example only and is not meant to be restrictive of the present disclosure. Thus, other configurations can be provided where the drive layer is positioned closer to a touch surface than the sense layer, and/or where the sense layer and the drive layer comprise the same layer. For instance, in a 1.5-layer implementation (e.g., where the drive layer and the sense layer are included on the same layer but physically separated from one another), one or more jumpers can be used to connect portions of a drive electrode 102 together. Similarly, jumpers can be used to connect portions of a sensor electrode 104 together. In other implementations, the drive layer and the sense layer may comprise the same layer (e.g., in a single-layer sensor configuration).

One or more capacitive touch panels 100 can be included with a touch screen assembly. The touch screen assembly may include a display screen, such as an LCD screen, where the sense layer and the drive layer are sandwiched between the LCD screen and a bonding layer, e.g., with a protective cover (e.g., glass) attached thereto. The protective cover may include a protective coating, an anti-reflective coating, and so forth. The protective cover may comprise a touch surface, upon which an operator can use one or more fingers, a stylus, and so forth to input commands to the touch screen assembly. The commands can be used to manipulate graphics displayed by, for example, the LCD screen. Further, the commands can be used as input to an electronic device connected to a capacitive touch panel 100, such as a multimedia device or another electronic device (e.g., as previously described).

Example Process

Figure 4:
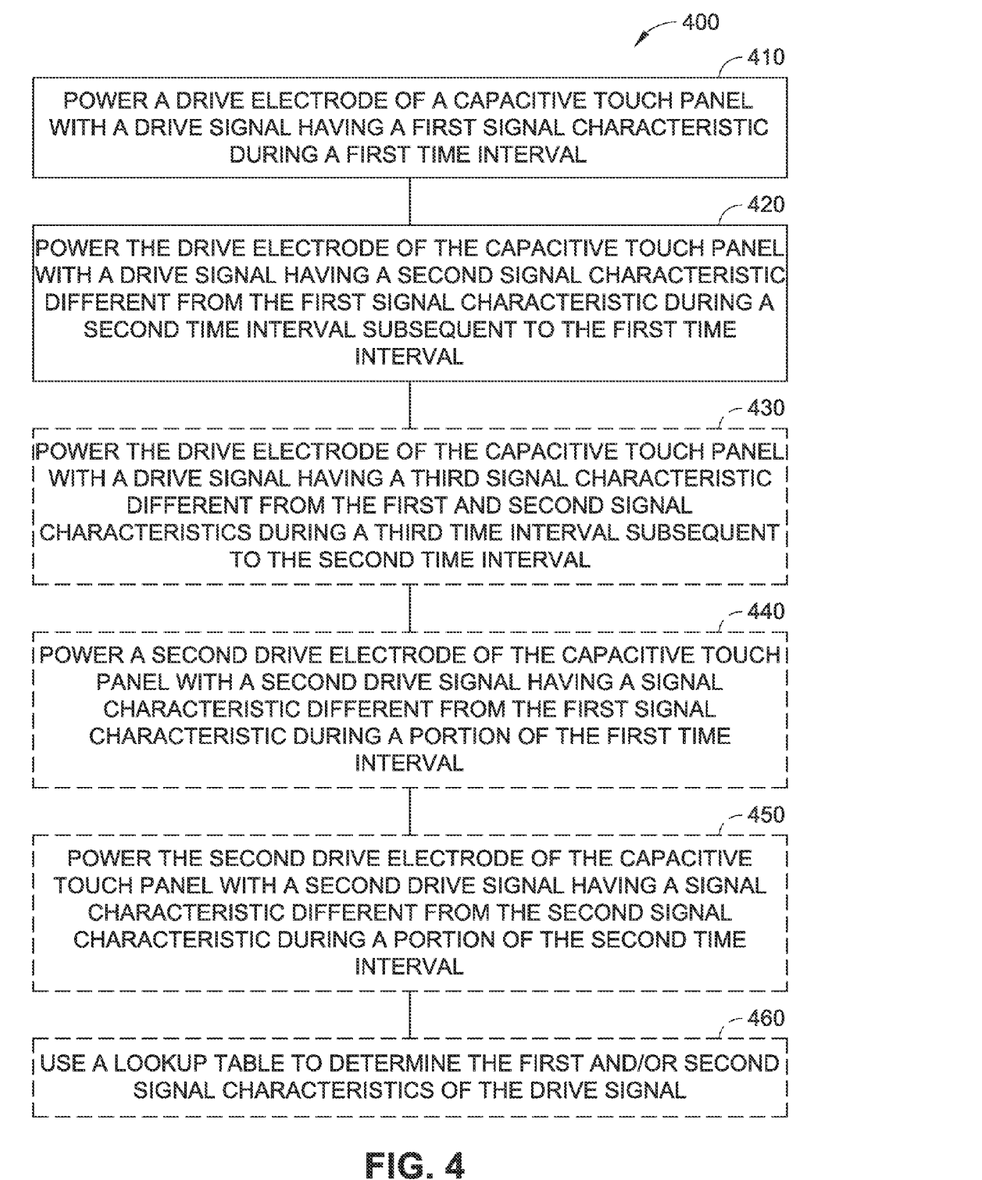
FIG. 4 is a flow diagram illustrating a method for driving a drive electrode of a capacitive touch panel in accordance with example implementations of the present disclosure.

Referring now to FIG. 4, example techniques are described for driving a drive electrode of a capacitive touch panel with a drive signal having a first signal characteristic during a first time interval, and at least a second signal characteristic different from the first signal characteristic during a second time interval subsequent to the first time interval.

FIG. 4 depicts a process 400, in an example implementation, for driving a drive electrode of a capacitive touch panel, such as the capacitive touch panel 100 illustrated in FIG. 1 and described above. In the process 400 illustrated, a drive electrode of a capacitive touch panel is powered with a drive signal having a first signal characteristic during a first time interval (Block 410). Then, the drive electrode of the capacitive touch panel is powered with a drive signal having a second signal characteristic different from the first signal characteristic during a second time interval subsequent to the first time interval (Block 420). For example, with reference to FIGS. 1 and 2, drivers 106 are configured to power drive electrodes 102 with one or more drive signals having a first signal characteristic during first time interval $t_1$, and a second signal characteristic at least substantially different from the first signal characteristic during second time interval $t_2$ subsequent to first time interval $t_1$.

In implementations, the drive electrode of the capacitive touch panel may be powered with a drive signal having a third signal characteristic different from the first and second signal characteristics during a third time interval subsequent to the second time interval (Block 430). For example, with continuing reference to FIGS. 1 and 2, drive electrodes 102 may be powered with a signal having a third signal characteristic during third time interval $t_3$ subsequent to second time interval $t_2$.

A second drive electrode of the capacitive touch panel may be powered with a second drive signal having a signal characteristic different from the first signal characteristic during a portion (some or all) of the first time interval (Block 440). Then, the second drive electrode of the capacitive touch panel may be powered with a second drive signal having a signal characteristic different from the second signal characteristic during a portion (some or all) of the second time interval (Block 450). For example, with continuing reference to FIGS. 1 and 2, one driver 106 can be configured to power a drive electrode 108 (or a subset of two or more drive electrodes) with a drive signal having a first signal characteristic during a first time interval $t_1$, and another driver 106 can be configured to power another drive electrode 110 (or a subset of two or more drive electrodes) with another drive signal having a second signal characteristic different from the first signal characteristic during at least a portion of the first time interval $t_j$.

In implementations, a lookup table can be used to determine the first and/or second signal characteristics of the drive signal (Block 460). For example, with reference to FIG. 3, memory module 118 may be used to store a lookup table for determining one or more pre-selected and/or random (e.g., pseudorandom) signal characteristics of a drive signal, such as frequency, phase, amplitude, and so forth. The memory module 118 may also store information regarding time intervals (e.g., duration) during which particular signal characteristics can be provided.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A capacitive touch panel comprising:
    a driver;
    a drive electrode configured to be connected to the driver, the driver configured to power the drive electrode with a drive signal having a first signal characteristic during a first time interval, and at least a second signal characteristic different from the first signal characteristic during a second time interval subsequent to the first time interval; and
    a sensor electrode arranged across the drive electrode, the drive electrode and the sensor electrode defining a coordinate location comprising a capacitor formed at a junction between the drive electrode and the sensor electrode for sensing a touch at the coordinate location, wherein the first time interval and the second time interval occur during a scan of the capacitive touch panel to sense a touch at the coordinate location; wherein
    the driver is configured to power the drive electrode with a drive signal having a third signal characteristic different from the first signal characteristic and the second signal characteristic during a third time interval subsequent to the second time interval.

2. The capacitive touch panel as recited in claim 1, wherein the first signal characteristic comprises at least one of a first frequency, a first phase, or a first amplitude, and the second signal characteristic comprises at least one of a second frequency, a second phase, or a second amplitude, wherein at least one of the first frequency, first phase, or first amplitude is different from at least one of the second frequency, second phase, or second amplitude, respectively.

3. The capacitive touch panel as recited in claim 1, further comprising:
    a second driver; and
    a second drive electrode configured to be connected to the second driver, the second driver configured to power the second drive electrode with a second drive signal having a third signal characteristic different from the first signal characteristic during at least a portion of the first time interval.

4. The capacitive touch panel as recited in claim 3, wherein the second driver is configured to power the second drive electrode with a second drive signal having a fourth signal characteristic different from the second signal characteristic during at least a portion of the second time interval.

5. The capacitive touch panel as recited in claim 1, wherein the driver comprises a digitally controlled oscillator.

6. The capacitive touch panel as recited in claim 1, wherein the first and second signal characteristics of the drive signal are determined using a lookup table.

7. A method comprising:
    powering a drive electrode of a capacitive touch panel with a drive signal having a first signal characteristic during a first time interval to sense a touch at a coordinate location defined by the drive electrode and a sensor electrode arranged across the drive electrode;
    powering the drive electrode of the capacitive touch panel with a drive signal having at least a second signal characteristic different from the first signal characteristic during a second time interval subsequent to the first time interval to sense a touch at the coordinate location, wherein the first time interval and the second time interval occur during a scan of the capacitive touch panel to sense a touch at the coordinate location; and
    powering the drive electrode of the capacitive touch panel with a drive signal having a third signal characteristic different from the first signal characteristic and the second signal characteristic during a third time interval subsequent to the second time interval.

8. The method as recited in claim 7, wherein the first signal characteristic comprises at least one of a first frequency, a first phase, or a first amplitude, and the second signal characteristic comprises at least one of a second frequency, a second phase, or a second amplitude, wherein at least one of the first frequency, first phase, or first amplitude is different from at least one of the second frequency, second phase, or second amplitude, respectively.

9. The method as recited in claim 7, further comprising powering a second drive electrode of the capacitive touch panel with a second drive signal having a third signal characteristic different from the first signal characteristic during at least a portion of the first time interval.

10. The method as recited in claim 9, further comprising powering the second drive electrode of the capacitive touch panel with a second drive signal having a fourth signal characteristic different from the second signal characteristic during at least a portion of the second time interval.

11. The method as recited in claim 7, wherein the drive electrode is powered with a digitally controlled oscillator.

12. The method as recited in claim 7, furthering comprising using a lookup table to determine the first and second signal characteristics of the drive signal.

13. A capacitive touch panel control system comprising:
    a driver configured to connect to a drive electrode with a sensor electrode arranged across the drive electrode, the drive electrode and the sensor electrode defining a coordinate location comprising a capacitor formed at a junction between the drive electrode and the sensor electrode for sensing a touch at the coordinate location, the driver configured to power the drive electrode with a drive signal having a first signal characteristic during a first time interval, and at least a second signal characteristic different from the first signal characteristic during a second time interval subsequent to the first time interval, the first time interval and the second time interval occurring during a scan of the capacitive touch panel to sense a touch at the coordinate location; and
    a lookup table for determining the first and second signal characteristics of the drive signal; wherein the driver is configured to power the drive electrode with a drive signal having a third signal characteristic different from the first signal characteristic and the second signal characteristic during a third time interval subsequent to the second time interval.

14. The capacitive touch panel control system as recited in claim 13, wherein the first signal characteristic comprises at least one of a first frequency, a first phase, or a first amplitude, and the second signal characteristic comprises at least one of a second frequency, a second phase, or a second amplitude, wherein at least one of the first frequency, first phase, or first amplitude is different from at least one of the second frequency, second phase, or second amplitude, respectively.

15. The capacitive touch panel control system as recited in claim 13, further comprising:
a second driver configured to be connected to a second drive electrode, the second driver configured to power the second drive electrode with a second drive signal having a third signal characteristic different from the first signal characteristic during at least a portion of the first time interval.

16. The capacitive touch panel control system as recited in claim 15, wherein the second driver is configured to power the second drive electrode with a second drive signal having a fourth signal characteristic different from the second signal characteristic during at least a portion of the second time interval.

17. The capacitive touch panel control system as recited in claim 13, wherein the driver comprises a digitally controlled oscillator.

\* \* \* \* \*